United States Patent [19]

Huber

[11] Patent Number: 4,628,289
[45] Date of Patent: Dec. 9, 1986

[54] LATCHING RELAY

[75] Inventor: William B. Huber, Oak Park, Ill.

[73] Assignee: Nuvatec, Inc., Downers Grove, Ill.

[21] Appl. No.: 786,612

[22] Filed: Oct. 11, 1985

[51] Int. Cl.⁴ ............................................. H01H 9/20
[52] U.S. Cl. .................................. 335/168; 335/157; 335/164; 335/167; 335/253
[58] Field of Search .............. 335/157, 164, 165, 166, 335/167, 168, 169, 170, 171, 174, 253, 254, 257, 272

[56] References Cited

U.S. PATENT DOCUMENTS

| | | |
|---|---|---|
| 2,916,584 | 5/1957 | Molyneux . |
| 3,304,444 | 2/1967 | Smith .................................. 335/170 |
| 3,569,878 | 3/1971 | Grass . |
| 3,914,723 | 10/1975 | Goodbar ............................. 335/170 |
| 3,984,795 | 10/1976 | Gaskill . |
| 4,150,348 | 4/1979 | Foltz ................................... 335/170 |
| 4,332,450 | 6/1982 | Griffith ............................... 335/234 |
| 4,383,234 | 5/1983 | Yatsushiro et al. ................. 335/253 |

Primary Examiner—E. A. Goldberg
Assistant Examiner—Lincoln D. Donovan
Attorney, Agent, or Firm—Willian Brinks Olds Hofer Gilson & Lione Ltd.

[57] ABSTRACT

A latching relay includes a housing and a coil secured to the housing. An armature is electromagnetically coupled to the coil such that current to the coil biases the armature to a first position. A spring is coupled to the armature to bias the armature to a second position. The relay includes a switch which includes a movable contact coupled to the armature such that the switch is in a first state when the armature is in the first position and the switch is in a second state when the armature is in the second position. A magnet is movable in the housing between a blocking position, in which the magnet acts as a mechanical block to prevent the armature from moving to the second position, and an unblocking position, in which the magnet allows the armature to move to the second position. The magnet is electromagnetically coupled to the coil such that current through the coil in a first direction moves the magnet to the blocking position and current through the coil in a second direction moves the magnet to the unblocking position.

17 Claims, 6 Drawing Figures

LATCHING RELAY

BACKGROUND OF THE INVENTION

The present invention relates to a latching relay which provides a particularly positive latching action.

One class of latching relays utilizes a permanent magnet to provide a bistable latch which is switched by a reversal of current in an electromagnetic coil. Foltz U.S. Pat. No. 4,150,348, Goodbar U.S. Pat. No. 3,914,723, Griffith U.S. Pat. No. 4,332,450, and Yatsushiro U.S. Pat. No. 4,383,234 provide four examples of such bistable latches. In each case, magnetic attraction between a permanent magnet and an adjacent movable ferromagnetic element holds a switch in one of two positions. Appropriate polarity of current to a coil is used to cause the latch to switch states. It is important to recognize that in these latching relays the strength of magnetic attraction between the magnet and the adjacent ferromagnetic element determines the force with which the switch is held in its latched position.

The present invention is directed to an improved latching relay which utilizes a mechanical blocking action to hold the relay in its latched position with a force substantially independent of the strength of magnetic attraction between the relevant elements.

SUMMARY OF THE INVENTION

According to this invention, a latching relay is provided which comprises a frame and a switch mounted to the frame. The switch includes at least one movable contact movable between a first state and a second state. Means are provided for electromagnetically moving the contact to the first state and means are provided for biasing the contact to the second state. A blocking member comprising a magnet which generates a magnetic field is movably mounted to the frame and is movable between a blocking position, in which the blocking member blocks movement of the contact to the second state, and an unblocking position, in which the blocking member allows the biasing means to move the contact to the second state. Means are provided for electromagnetically shifting the blocking member between the blocking position and the unblocking position, and the blocking member cooperates with the frame when the blocking member is in the blocking position to restrain movement of the contact to the second state with a force independent of the strength of the magnetic field.

The present invention provides important advantages. In particular, the preferred embodiment described below provides a rugged and secure latching action which renders the latching relay relatively resistant to shock and vibration. This embodiment requires no power to hold the relay in the latched position, and it requires no precise balancing of magnetic forces to achieve the desired switching action. The preferred embodiment described below is particularly appropriate for switching high amperage currents.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
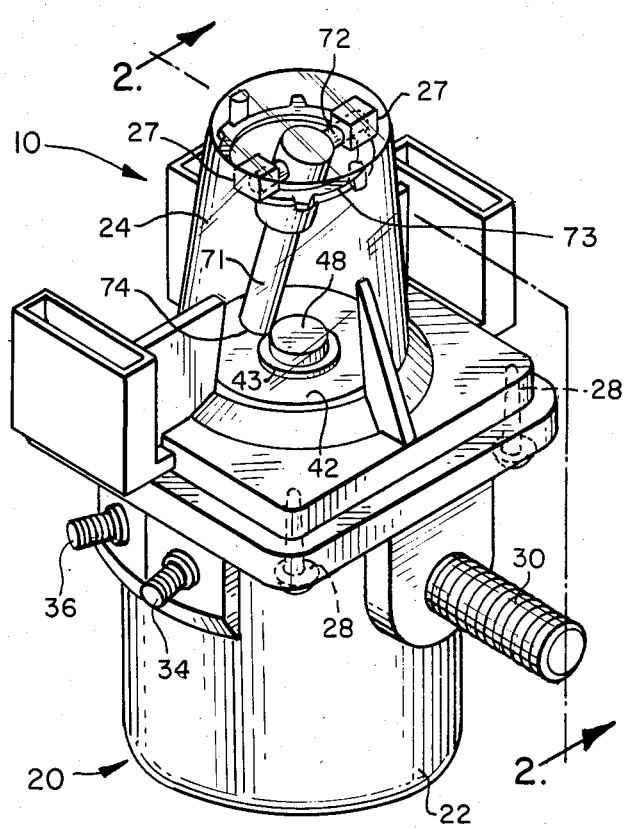
FIG. 1 is a perspective view of a latching relay which incorporates a presently preferred embodiment of this invention.
Figure 2:
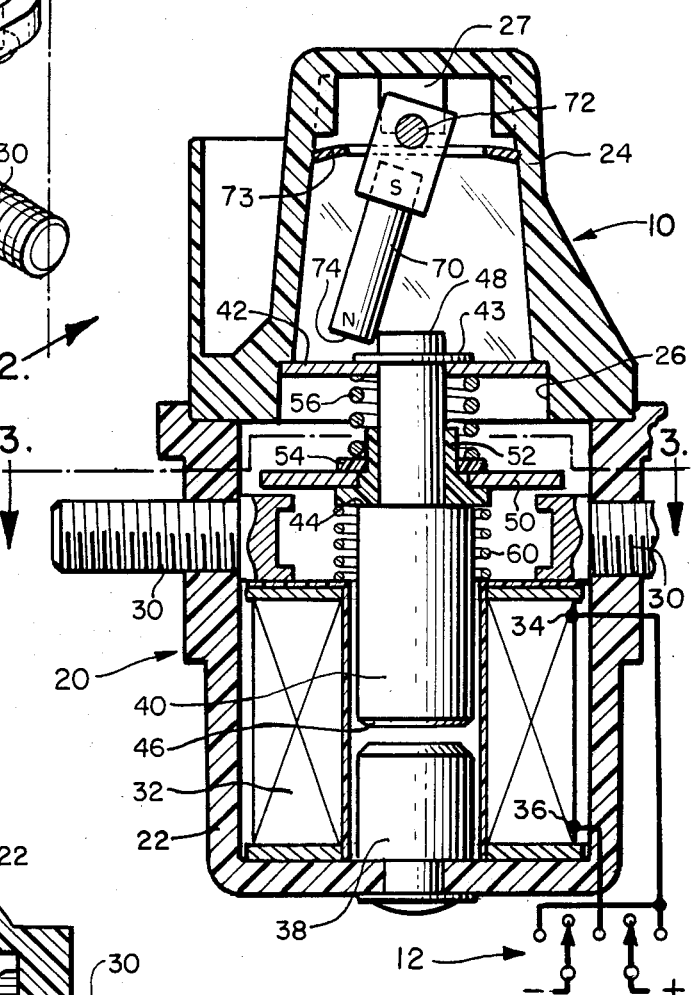
FIG. 2 is a longitudinal sectional view taken along line 2—2 of FIG. 1 showing the relay in the unlatched position.
Figure 3:
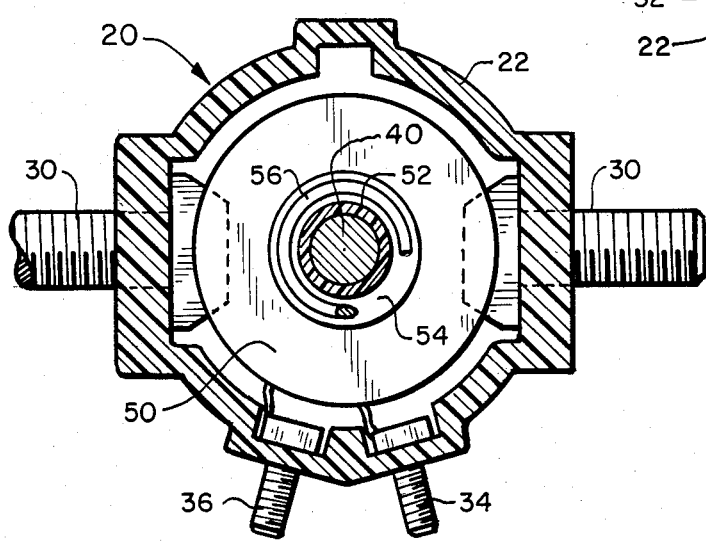
FIG. 3 is a cross-sectional view taken along line 3—3 of FIG. 2.

Turning now to the drawings, FIGS. 1 through 6 show various views of a latching relay 10 which incorporates a presently preferred embodiment of this invention. As best shown in FIG. 2, this relay 10 includes a housing 20 which includes a lower housing section 22 and an upper housing section 24. The upper housing section 24 defines an annular, internal guide surface 26 as well as a pair of spaced, parallel lugs 27. An array of fasteners 28 is used to mount the upper housing section 24 rigidly to the lower housing section 22.

A pair of spaced, co-linear fixed contacts 30 are rigidly mounted to the lower housing section 22. In addition, an electrical coil 32 is mounted in the lower housing section 24, and this coil 32 includes a pair of electrical leads 34,36. A pole piece 38 is rigidly mounted to the lower housing section 22 to extend partially up into an interior passage defined by the coil 32.

An armature or solenoid plunger 40 is mounted to slide axially inside the coil 32. The armature 40 is formed of a ferromagnetic material and defines a first end 46 and a second end 48. The first end 46 is positioned to come into contact with the pole piece 38, and the second end 48 is positioned to extend out of the coil 32. A guide ring 42 is mounted on the second end 48 of the armature 40. This guide ring 42 cooperates with the guide surface 26 to guide the axial movement of the armature 40. A lock washer 43 holds the guide ring 42 in place. The armature 40 defines a shoulder 44 at an intermediate section.

A movable contact 50, which in this embodiment is annular in shape, is mounted to an annular collar 52. A retaining washer 54 holds the movable contact 50 in place on the collar 52. The collar 52 is shaped to slide axially on the armature 40, and axial movement of the collar 52 is limited by the shoulder 44. A spring 56, which in this embodiment is a coil spring, is interposed between the guide ring 42 and the retaining washer 54 to bias the collar 52 into contact with the shoulder 44.

A spring 60 is coupled between the armature 40 and the coil 32 to bias the armature 40 to the position shown in FIG. 2. In this position, the movable contact 50 is out of contact with the fixed contacts 30, and no electrical interconnection is provided between the fixed contacts 30.

A permanent magnet 70 is pivotably mounted by means of a pivot shaft 72, which is held against the lugs 27 defined by the upper housing section 24 by a lock washer 73. The magnet 70 defines a free end 74 which in this preferred embodiment is a north magnetic pole. As shown in FIG. 2, in this preferred embodiment the pivot shaft 72 is oriented transversely to the axial direction in which the armature 40 moves.

FIG. 2 shows the relay 10 in the unlatched state. In this state no current is supplied to the coil 32, and the spring 60 holds the movable contact 50 away from the fixed contacts 30. In the unlatched state no electrical interconnection is provided between the fixed contacts 30.

Figure 4:
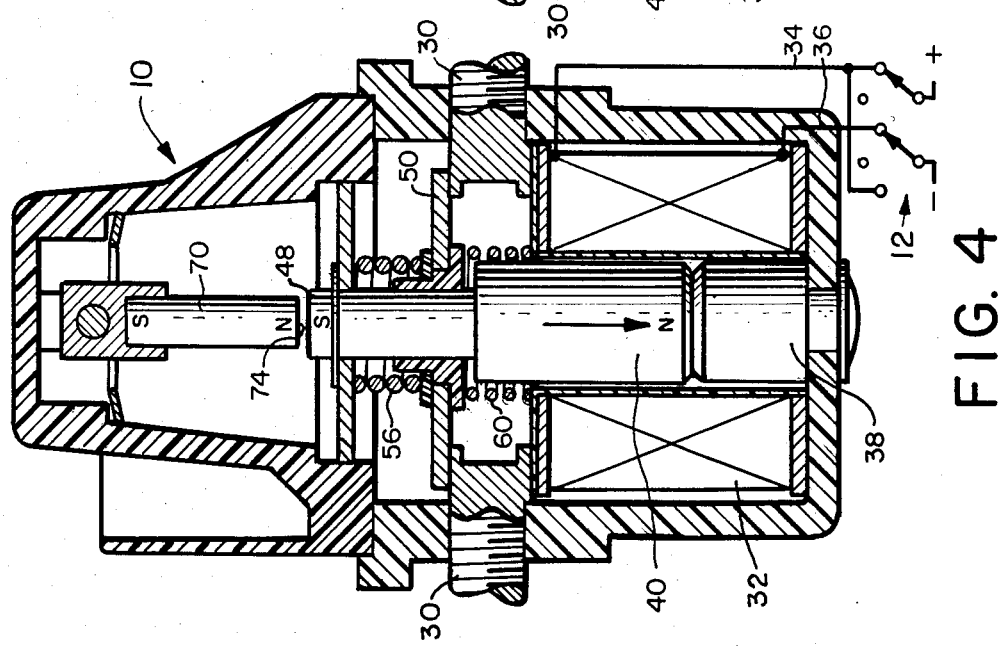
FIG. 4 is a longitudinal sectional view corresponding to FIG. 2 showing the relay energized to latch.

FIG. 4 shows a view of the latching relay 10 comparable to FIG. 2; however, in FIG. 4 the relay 10 is shown with a current of a first polarity passing through the coil 32. This can be accomplished, for example, by switching the double pole, double throw switch 12 shown in FIGS. 2 and 4-6 to the right. When current of this first polarity is passed through the coil 32, the coil 32 generates a magnetic field which moves the armature 40 into contact with the pole piece 38, thereby compressing the spring 60. Current of this first polarity creates a south magnetic pole at the second end 48 of the armature 40. When the armature 40 is moved to the position shown in FIG. 4, the movable contact 50 is brought into contact with the fixed contacts 30, thereby providing an electrical interconnection between the two fixed contacts 30. The collar 52 moves as necessary to ensure that the fixed and movable contacts 30,50 remain in contact. The spring 56 biases the movable contact 50 toward the fixed contacts 30.

In FIG. 4, the south magnetic pole of the second end 48 of the armature 40 attracts the free end 74 of the permanent magnet 70 and biases the magnet 70 to the blocking position shown in FIG. 4. In this blocking position, the magnet 70 is oriented axially to abut the armature 40.

Figure 5:
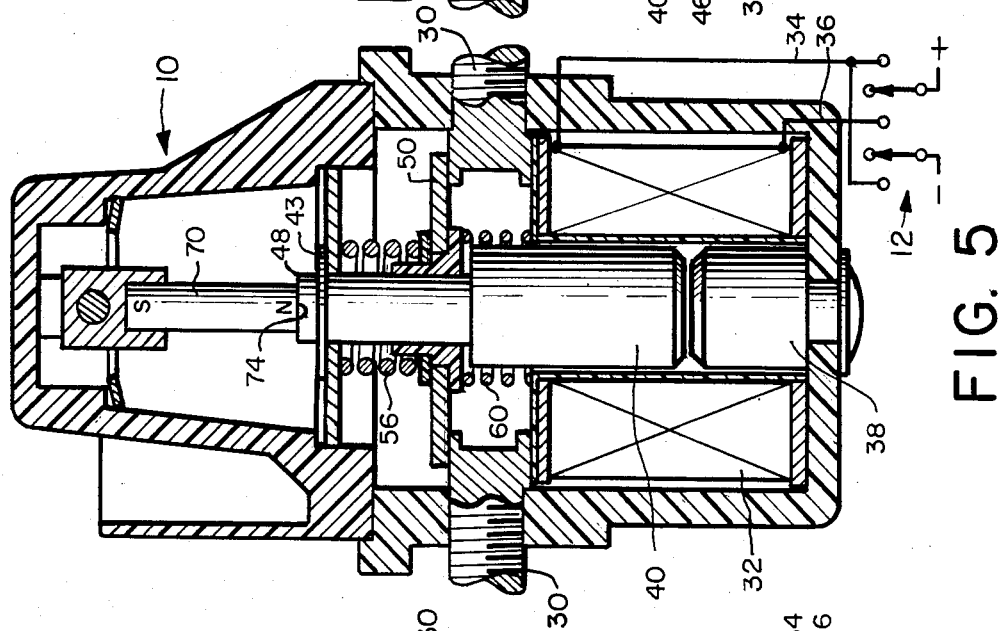
FIG. 5 is a longitudinal sectional view corresponding to FIG. 4 showing the relay in the latched position.

FIG. 5 shows the configuration of the relay 10 after current of the first polarity has been removed from the coil 32. In FIG. 5 no current is passing through the coil 32 and consequently there is no magnetic attraction between the pole piece 38 and the armature 40. The spring 60 attempts to restore the armature 40 to the position shown in FIG. 2. However, the magnet 70 acts as a rigid mechanical strut or blocking member, thereby preventing the armature 40 from returning to the position of FIG. 2. The spring 56 maintains the movable contact 50 in contact with the fixed contacts 30.

Figure 6:
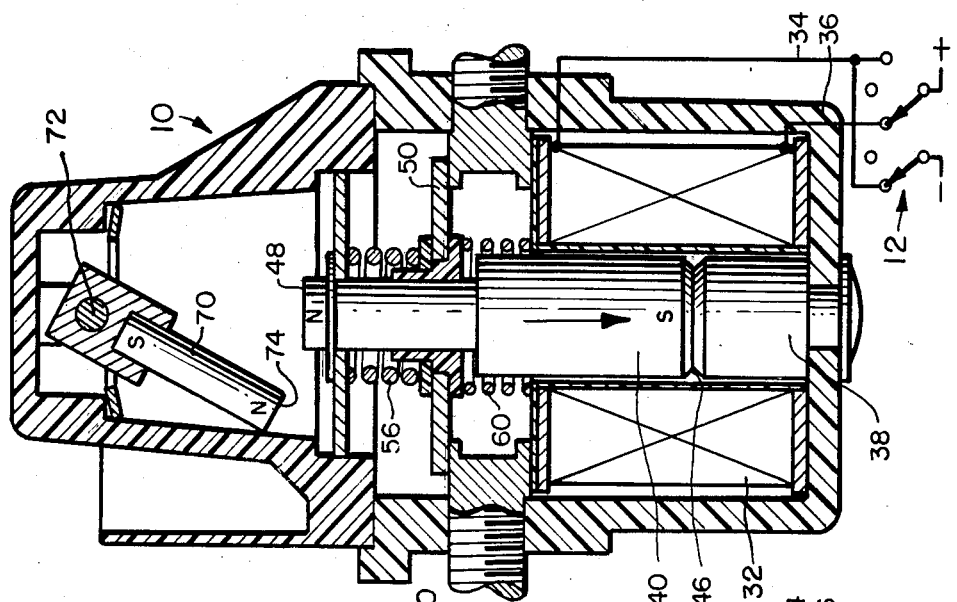
FIG. 6 is a longitudinal sectional view corresponding to FIG. 4 showing the relay energized to unlatch.

FIG. 6 shows the configuration of the relay 10 when the coil 32 is energized with a current of reverse polarity. This can be accomplished for example by moving the switch 12 to the left. In this configuration, magnetic attraction between the pole piece 38 and the armature 40 brings the first end 46 of the armature 40 into contact with the pole piece 38. This overtravel removes the armature 40 from contact with the magnet 70 and frees the magnet 70 to pivot about the pivot shaft 72. When the coil 32 is energized with current of reverse polarity as shown in FIG. 6, the second end 48 of the armature 40 forms a north magnetic pole which repels the north magnetic pole of the free end 74 of the magnet 70. This repulsion causes the magnet 70 to pivot about the pivot shaft 72 to the unblocking position shown in FIG. 6. In this unblocking position, the magnet 70 is positioned obliquely with respect to the axial direction in an unblocking position, and the free end 74 of the magnet 70 is no longer aligned with the armature 40.

When current of reverse polarity is removed from the coil 32, the spring 60 moves the armature 40 to the unlatched position shown in FIG. 2. Because the magnet 70 was originally in the unblocking position shown in FIG. 6, the free end 74 of the magnet 70 does not come into contact with the armature 40, and the armature 40 in effect props the magnet 70 in the unblocking position. As explained above, in this position the spring 60 lifts the movable contact 50 away from the fixed contacts 30, thereby interrupting electrical contact between the two fixed contacts 30.

The preferred embodiment described above provides a number of important advantages. Because the magnet 70 acts as a mechanical block, holding the armature 40 in the latched position, the relay 10 is relatively insensitive to shock and vibration. No power is required to hold the relay 10 in either the latched or the unlatched position, and no precise balancing of magnetic forces is required to obtain the desired latching action. In particular, the force with which the armature 40 is held in the latched position is substantially independent of the strength of the magnetic field generated by the magnet 70. The particular arrangement of the fixed and movable contacts 30,50 is well suited for a high amperage relay, of the sort usable in an automotive vehicle for example.

In order better to define the presently preferred embodiment of this invention, the following details of construction are provided. However, it should be clearly understood that these details are intended only by way of illustration. In this embodiment, the housing 22 can alternately be formed of an insulating thermoplastic material such as a polycarbonate or a thermosetting material such as Bakelite. The spring 60 develops a spring force less than that of the spring 56. The fixed contacts 30 are preferably formed of copper, and the movable contact 50 is preferably formed of cadmium plated copper.

Of course, it should be understood that a wide range of changes and modifications can be made to the preferred embodiment described above. For example, the magnet which acts as a blocking member can be mounted to slide with respect to the housing rather than to pivot. Furthermore, the action of the relay can be reversed such that the contacts are closed when the blocking member is in the unblocked position. Of course, details of construction, geometry and materials can be varied as necessary to suit the particular application. For example, a lower amperage version of the latching relay of this invention may well utilize contacts of lower mass. It is therefore intended that the foregoing detailed description be regarded as illustrative rather than limiting, and that it be understood that it is the following claims, including all equivalents, which are intended to define the scope of this invention.

I claim:
1. A latching relay comprising:
a frame;
a switch mounted to the frame and including at least one movable contact movable between a first state and a second state, wherein the switch is open in one of the first and second states and closed in the other;
moving means for generating an electromagnetic field to electromagnetically move the contact to the first state;
means for biasing the contact to the second state;
a blocking member comprising a permanent magnet which generates a magnetic field, said blocking member movably mounted to the frame and movable between a blocking position, in which the blocking member holds the contact in the first state, and an unblocking position, in which the blocking member allows the biasing means to move the contact to the second state;
said electromagenetic field operative to interact with the magnet to electromagnetically shift the block- ing member between the blocking position and the unblocking position;

said blocking member cooperating with the frame when the blocking member is in the blocking position to restrain movement of the contact to the second state with a force independent of the strength of the magnetic field.

2. The latching relay of claim 1 wherein the moving means comprises:
a coil mounted to the frame;
an armature mounted to move with respect to the coil in response to current in the coil; and
means for mounting the contact to the armature.

3. The latching relay of claim 2 wherein the biasing means comprises a spring coupled to the armature.

4. The invention of claim 2 wherein the blocking member magnet is pivotably mounted to the frame to pivot about a pivot axis, and wherein the blocking member defines an end configured to abut the armature when the magnet is in the blocking position such that the magnet acts as a rigid strut extending between the armature and the pivot axis.

5. The invention of claim 2 wherein the shifting means comprises a terminal portion of the armature which is formed of a ferromagnetic material such that the terminal portion selectively attracts the magnet when voltage of a first polarity is applied across the coil and the terminal portion selectively repels the magnet when voltage of a second polarity, opposite to the first polarity, is applied across the coil.

6. The invention of claim 2 wherein the switch further comprises a fixed contact, and wherein the means for mounting the contact to the armature comprises means for resiliently biasing the movable contact toward the fixed contact.

7. A latching relay comprising:
a housing;
a coil secured to the housing;
an armature electromagnetically coupled to the coil such that current throug the coil biases the armature to a first position;
a spring coupled to the armature to bias the armature to a second position;
a switch comprising a movable contact coupled to the armature such that the switch is in a first state when the armature is in the first position and the switch is in a second state when the armature is in the second position;
a magnet movably mounted to the housing and movable between a blocking position, in which the magnet acts as a mechanical block to prevent the armature from moving to the second position and thereby hold the switch in the first state, and an unblocking position, in which the magnet allows the armature to move to the second position;
said magnet electromagnetically coupled to the coil such that current through the coil in a first direction moves the magnet to the blocking position and current through the coil in a second direction moves the magnet to the unblocking position.

8. The latching relay of claim 7 wherein the switch is closed in the first state and open in the second state.

9. The latching relay of claim 7 wherein the armature defines an axial direction; wherein the first and second armature positions are spaced along the axial direction; wherein the magnet is mounted to the housing to pivot about a pivot axis; and wherein the pivot axis is arranged such that the magnet extends along the axial direction and abuts the armature when in the blocking position, and the magnet extends obliquely to the axial direction to one side of the armature when in the unblocking position.

10. The latching relay of claim 7 wherein the movable contact is mounted to slide along the armature, wherein the switch further comprises a fixed contact, and wherein the invention furhter comprises a contact spring coupled to the movable contact to bias the movable contact into contact with the fixed contact when the armature is in the first position.

11. A latching relay comprising:
a housing;
an armature mounted to slide in an axial direction in the housing, said armature defining an end section;
a pair of fixed contacts, each mounted to the housing;
a movable contact;
means for mounting the movable contact to the armature;
a spring coupled to the armature to bias the armature to a second position, in which the movable contact is out of contact with the fixed contacts;
a coil, mounted to the housing to bias the armature to a first position, in which the movable contact interconnects the fixed contacts, when a current is passed through the coil, said coil operating to create a magnetic pole of a first polarity at the end section of the armature when the current is in a first direction and a magnetic pole of a second polarity at the end section of the armature when the current is in a second direction, opposed to the first direction;
a permanent magnet having first and second ends;
means for pivotably mounting the first end of the magnet to the housing such that the magnet is pivotable between a blocking position, in which the magnet is oriented axially and the second end of the magnet abuts the end section of the armature such that the magnet acts as a mechanical block to prevent movement of the armature to the second position thereby holding the movable contact against the fixed contacts, and an unblocking position, in which the magnet is oriented obliquely to the axial direction and the magnet allows the armature to move to the second position;
said coil cooperating with the armature to move the magnet to the blocking position in response to current through the coil in the first direction and to move the magnet to the unblocking position in response to current through the coil in the second direction.

12. The latching relay of claim 11 wherein the magnet is rectilinear, and wherein the magnet pivots about a pivot axis oriented transverse to the axial direction.

13. The latching relay of claim 11 wherein the means for mounting the movable contact to the armature comprises a contact spring coupled to the movable contact to bias the movable contact toward the fixed contacts.

14. The latching relay of claim 11 wherein the movable contact is annular, and wherein the movable contact is positioned around the armature.

15. A latching relay comprising:
a frame;
a switch mounted to the frame and including at least one movable contact movable between a first state and a second state, wherein the switch is open in one of the first and second states and closed in the other;

means for electromagnetically moving the contact to the first state, wherein said moving means comprises a first element mounted to the frame; an armature mounted to move with respect to the first element; means for mounting a coil on one of the first element and armature such that the armature moves with respect to the first element in response to current in the coil; and means for coupling the contact to the armatures;

means for biasing the contact to the second state;

a blocking member comprising a magnet which generates a magnetic field, said blocking member movably mounted to the frame and movable between a blocking position, in which the blocking member holds the contact in the first stae, and an unblocking position, in which the blocking member allows the biasing means to move the contact to the second state; and means for electromagnetically shifting the blocking member between the blocking position and the unblocking position;

said blocking member cooperating with the frame when the blocking member is in the blocking position to restrain movement of the contact to the second state with a force independent of the strength of the magnetic field;

wherein the blocking member is swingably mounted to the frame, and wherein the blocking member defines an end configured to abut the armature when the blocking member is in the blocking position such that the blocking member acts as a rigid strut extending between the armature and the frame.

16. A latching relay comprising:

a frame;

a switch mounted to the frame and including at least one movable contact movable between a first state and a second state, wherein the switch is open in one of the first and second states and closed in the other;

means for electromagnetically moving the contact to the first state, said moving means comprising a first element mounted to the frame; an armature mounted to move with respect to the first element; means for mounting a coil on one of the first element and the armature such that the armature moves with respect to the first element in response to current in the coil; and means for coupling the contact to the armature:

means for biasing the contact to the second state;

a blocking member comprising a magnet which generates a magnetic field, said blocking member movably mounted to the frame and movable between a blocking position, in which the blocking member holds the contact in the first state, and an unblocking position, in which the blocking member allows the biasing means to move the contact to the second state; and means for electromagnetically shifting the blocking member between the blocking position and the unblocking position;

said blocking member cooperating with the frame when the blocking member is in the blocking position to restrain movement of the contact to the second state with a force independent of the strength of the magnetic field;

wherein the shifting means comprises a portion of the armature which is formed of a material such that the portion selectively attracts the magnet when voltage of a first polarity is applied across the coil and the portion selectively repels the magnet when voltage of a second polarity, opposite to the first polarity, is applied across the coil.

17. A latching relay comprising:

a frame;

a switch mounted to the frame and including at least one movable contact movable between a first state and a second state, wherein the switch is open in one of the first and second states and closed in the other;

means for electromagnetically moving the contact to the first state, said moving means comprising a first element mounted to the frame; an armature mounted to move with respect to the first element; means for mounting a coil on one of the first element and the armature such that the armature moves with respect to the first element in response to current in the coil; and means for coupling the contact to the armature;

means for biasing the contact to the second state;

a blocking member comprising a magnet which generates a magnetic field, said blocking member movably mounted to the frame and movable between a blocking position, in which the blocking member holds the contact in the first state, and an unblocking position, in which the blocking member allows the biasing means to move the contact to the second state; and means for electomagnetically shifting the blocking member between the blocking position and the unblocking position;

said blocking member cooperating with the frame when the blocking member is in the blocking position to restrain movement of the contact to the second state with a force independent of the strength of the magnetic field;

wherein the switch further comprises a fixed contact, and wherein the means for coupling the contact to the armature comprises means for resiliently biasing the movable contact toward the fixed contact.

* * * * *

UNITED STATES PATENT AND TRADEMARK OFFICE
CERTIFICATE OF CORRECTION

PATENT NO. : 4,628,289
DATED : Dec. 9, 1986
INVENTOR(S) : William B. Huber

It is certified that error appears in the above-identified patent and that said Letters Patent is hereby corrected as shown below:

<u>IN THE CLAIMS</u>

In Claim 1 (column 4, line 67), please delete "electromagenetic" and substitute therefor --electromagnetic--;

In Claim 7 (column 5, line 40), please delete "throug" and substitute therefor --through--;

In Claim 10 (column 6, line 8), please delete "furhter" and substitute therefor --further--;

In Claim 15 (column 7, line 15), please delete "stae" and substitute therefor --state--;

In Claim 16 (column 7, line 49), please delete "armature:" and substitute therefor --armature;--.

Signed and Sealed this

Twelfth Day of April, 1988

*Attest:*

DONALD J. QUIGG

*Attesting Officer*    *Commissioner of Patents and Trademarks*